(12) United States Patent (10) Patent No.: US 12,678,964 B2

Li et al. (45) Date of Patent: Jul. 14, 2026

(54) ROBOT AND ROBOT-BASED MATERIAL BOX DETECTION METHOD

(71) Applicant: Beijing Geekplus Technology Co., Ltd., Beijing (CN)

(72) Inventors: Zewei Li, Beijing (CN); Pengfei Wang, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 172 days.

(21) Appl. No.: 18/283,709

(22) PCT Filed: Mar. 16, 2022

(86) PCT No.: PCT/CN2022/081276

§ 371 (c)(1),
(2) Date: Sep. 22, 2023

(87) PCT Pub. No.: WO2022/199448

PCT Pub. Date: Sep. 29, 2022

(65) Prior Publication Data

US 2024/0165819 A1 May 23, 2024

(30) Foreign Application Priority Data

Mar. 24, 2021 (CN) ......................... 202110312616.2

(51) Int. Cl.
B25J 9/16 (2006.01)
B25J 11/00 (2006.01)
(Continued)

(52) U.S. Cl.
CPC ........... B25J 9/1697 (2013.01); B25J 11/008 (2013.01); B25J 19/02 (2013.01); B25J 19/04 (2013.01);
(Continued)

(58) Field of Classification Search
CPC ........ B25J 9/1697; B25J 11/008; B25J 19/04; B25J 5/00; B25J 9/1692; B25J 13/08;
(Continued)

(56) References Cited

U.S. PATENT DOCUMENTS

2007/0273892 A1* 11/2007 Asari ................ H01L 21/67757
356/614
2011/0276175 A1* 11/2011 Takagawa ............ B65G 1/0407
700/218

(Continued)

FOREIGN PATENT DOCUMENTS

CN      109573449 A      4/2019
CN      209192821 U   *    8/2019   ......... B66F 9/07504

(Continued)

OTHER PUBLICATIONS

CN209192821U, Carrying Trolley, Zeng et al., Filed: Nov. 2, 2018 Pub: Aug. 2, 2019, English Translation (Year: 2019).*

(Continued)

*Primary Examiner* — Jason Holloway
*Assistant Examiner* — Benjamin J Brosh
(74) *Attorney, Agent, or Firm* — Cozen O'Connor

(57) ABSTRACT

A robot and a robot-based material box detection method, the robot including: a main control processing unit, a picking up and placing assembly, and a detection assembly arranged on the picking up and placing assembly; the detection assembly is configured to align with a storage position to be detected along a detection direction to collect data and send the same to the main control processing unit; and the main control processing unit is configured to determine a material box storage state in the storage position to be detected based on a data collection result, so as to control the picking up and placing assembly to pick up and place the material box.

17 Claims, 5 Drawing Sheets

(51) Int. Cl.

| | |
|---|---|
| *B25J 19/02* | (2006.01) |
| *B25J 19/04* | (2006.01) |
| *B65G 1/04* | (2006.01) |
| *B65G 1/137* | (2006.01) |
| *B66F 9/075* | (2006.01) |
| *B66F 9/08* | (2006.01) |

(52) U.S. Cl.
CPC ......... *B65G 1/0421* (2013.01); *B65G 1/0492* (2013.01); *B65G 1/1375* (2013.01); *B66F 9/0755* (2013.01); *B66F 9/085* (2013.01)

(58) Field of Classification Search
CPC ...... B25J 19/02; B65G 1/0492; B65G 1/1375; B65G 1/0421; B65G 1/04; B65G 1/1373; B65G 2201/025; B65G 2203/042; B66F 9/0755; B66F 9/085; G05D 2105/28; G05D 2107/70; G05D 2109/10; G05D 1/667; G05B 2219/45056; G05B 2219/45063; Y02P 90/02
See application file for complete search history.

(56) References Cited

U.S. PATENT DOCUMENTS

| | | | | |
|---|---|---|---|---|
| 2016/0167879 | A1* | 6/2016 | Masuda | B65G 1/0421 |
| | | | | 414/274 |
| 2016/0289002 | A1* | 10/2016 | Morikawa | H01L 21/68 |
| 2017/0357270 | A1* | 12/2017 | Russell | G06V 20/10 |
| 2019/0352092 | A1* | 11/2019 | Zheng | B65G 1/1375 |
| 2020/0316786 | A1* | 10/2020 | Galluzzo | B25J 9/162 |
| 2021/0056499 | A1* | 2/2021 | Jacobus | G05D 1/0274 |
| 2021/0323767 | A1* | 10/2021 | Liu | B66F 9/183 |
| 2021/0395007 | A1* | 12/2021 | Galluzzo | B65G 1/1371 |
| 2021/0395014 | A1* | 12/2021 | Chen | G06Q 10/06 |
| 2022/0169446 | A1* | 6/2022 | Cheng | B65G 1/137 |
| 2022/0177222 | A1* | 6/2022 | Ji | B66F 9/063 |
| 2023/0150769 | A1* | 5/2023 | Al | B65G 1/0407 |
| | | | | 700/214 |
| 2023/0159274 | A1* | 5/2023 | Liu | B25J 5/007 |
| | | | | 700/214 |
| 2023/0286750 | A1* | 9/2023 | Li | G05D 1/0212 |
| 2024/0157549 | A1* | 5/2024 | Lin | B25J 9/1676 |

FOREIGN PATENT DOCUMENTS

| | | | |
|---|---|---|---|
| CN | 110451150 | A | 11/2019 |
| CN | 110537189 | A | 12/2019 |
| CN | 209961911 | U | 1/2020 |
| CN | 110842908 | A | 2/2020 |
| CN | 111348361 | A | 6/2020 |
| CN | 111409996 | A | 7/2020 |
| CN | 111824668 | A | 10/2020 |
| CN | 112407726 | A | 2/2021 |
| CN | 113086467 | A | 7/2021 |
| WO | 2007012099 | A1 | 2/2007 |
| WO | 2020004059 | A1 | 1/2020 |
| WO | 2020135460 | A1 | 7/2020 |

OTHER PUBLICATIONS

Cuemath, "Arctan", 2021, Retrieved from the internet Apr. 28, 2025, URL: <https://www.cuemath.com/trigonometry/arctan/> (Year: 2021).*

Extended European Search Report issued in European Patent Application No. 22774109.7 on Jan. 29, 2025.

International Search Report (English and Chinese) and Written Opinion (Chinese) of the ISA issued in PCT/CN2022/081276, mailed Jun. 17, 2022; ISA/CN.

* cited by examiner

Figure 10:
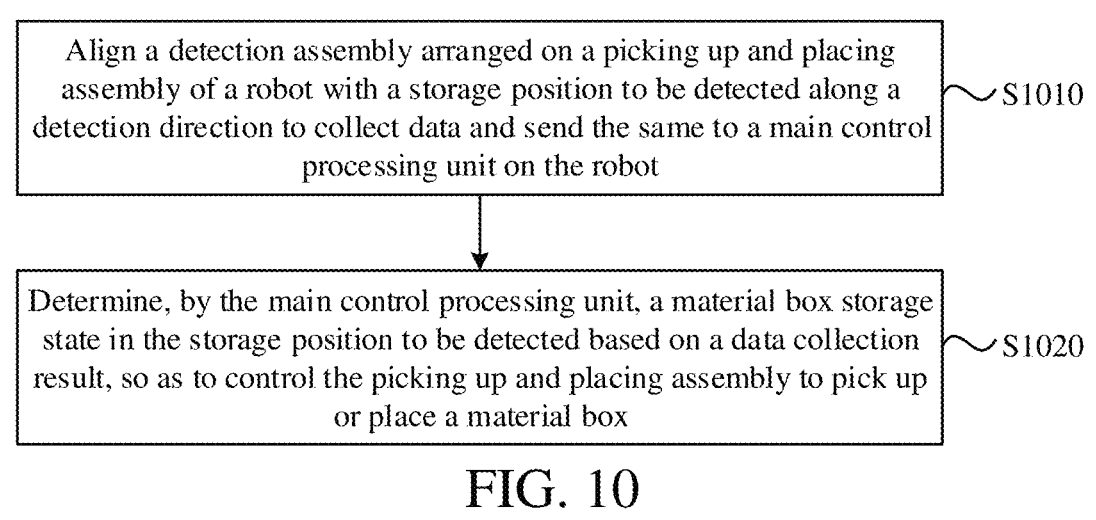

| |
|---|
| Align a detection assembly arranged on a picking up and placing assembly of a robot with a storage position to be detected along a detection direction to collect data and send the same to a main control processing unit on the robot |

~S1010

| |
|---|
| Determine, by the main control processing unit, a material box storage state in the storage position to be detected based on a data collection result, so as to control the picking up and placing assembly to pick up or place a material box |

ROBOT AND ROBOT-BASED MATERIAL BOX DETECTION METHOD

CROSS-REFERENCE TO RELATED APPLICATIONS

This application is the national phase of International Application No. PCT/CN2022/081276, titled "ROBOT AND ROBOT-BASED MATERIAL BOX DETECTION METHOD", filed on Mar. 16, 2022, which is based on and claims priority to Chinese Patent Application No. 202110312616.2 filed on Mar. 24, 2021. The entire disclosures of the above applications are incorporated herein by reference in their entirety.

TECHNICAL FIELD

Embodiments of the present disclosure relate to the field of robot technology, and in particular relate to a robot and a robot-based material box detection method.

BACKGROUND

With continuous development of robots, they are gradually applied to the warehousing and logistics industry. In the business scenario of material box robots, it is usually necessary to obtain a material box storage state to better schedule the robots to perform the task of picking up and returning the box. Although it is possible to use a scheduling system to record the position of the material box and changes in the position of the material box caused by the picking up and returning operations every time, such a solution is only limited to normal picking up and returning operations of the robots. Once an abnormal situation occurs during the robots' operation, for example, a material box drops or a certain material box is manually placed on a pallet, the scheduling system cannot accurately record the position and the material box storage state, resulting in inability to schedule the robots to perform the task of picking up and returning the box.

SUMMARY

Embodiments of the present disclosure provide a robot and a robot-based material box detection method, used for accurately detecting a material box storage state in a specified position.

In the first aspect, an embodiment of the present disclosure provides a robot, including a main control processing unit, a picking up and placing assembly, and a detection assembly arranged on the picking up and placing assembly, where the detection assembly is configured to align with a storage position to be detected along a detection direction to collect data and send the same to the main control processing unit; and the main control processing unit is configured to determine a material box storage state in the storage position to be detected based on a data collection result, so as to control the picking up and placing assembly to pick up or place a material box.

In the second aspect, an embodiment of the present disclosure further provides a robot-based material box detection method, including the following steps: aligning a detection assembly arranged on a picking up and placing assembly of a robot with a storage position to be detected along a detection direction to collect data and send the same to a main control processing unit on the robot; and determining, by the main control processing unit, a material box storage state in the storage position to be detected based on a data collection result, so as to control the picking up and placing assembly to pick up or place a material box.

In the third aspect, an embodiment of the present disclosure further provides a computer-readable storage medium on which a computer program is stored, the program, when executed by a processor, implementing the aforementioned robot-based material box detection method.

In the fourth aspect, an embodiment of the present disclosure further provides a computer program product including computer program code, the computer program code, when run on a computer, performing the aforementioned robot-based material box detection method.

In the fifth aspect, an embodiment of the present disclosure further provides a computer program including computer program code, the computer program code, when run on a computer, causing the computer to perform the aforementioned robot-based material box detection method.

According to the solution of the robot provided in the embodiments of the present disclosure, the detection assembly on the robot may automatically align with the storage position to be detected to collect data, and the main control processing unit on the robot can determine the material box storage state in the storage position to be detected based on a data collection result of the detection assembly, so as to control the picking up and placing assembly on the robot to pick up and place the material box. By adopting the solutions of the embodiments of the present disclosure, whether in the scenario of normal picking up and returning operations of the robot or human interference with the material box, the position state of the material box can be obtained through directional detection performed by the detection assembly on the robot, thereby avoiding abnormal picking up and returning operations of the robot. Also, when the scheduling system cannot accurately record the position and the material box storage state and cannot schedule the robot to perform the task of picking up and returning the box, the condition can be reported to the scheduling system in time, thereby improving the efficiency and reliability of the system.

The above summary is only an overview of the technical solutions of the present disclosure. In order to understand the technical means of the present disclosure more clearly and implement the technical means according to the content of the specification, and make the above and other objectives, features, and advantages of the present disclosure more obvious and easy to understand, a detailed description of the present disclosure will be given below.

BRIEF DESCRIPTION OF THE DRAWINGS

By the detailed description of non-limiting embodiments made with reference to the following accompanying drawings, the other features, objectives, and advantages of the present disclosure will become more apparent. The accompanying drawings are only intended to illustrate the preferred embodiments and are not considered a limitation of the present disclosure. Throughout the drawings, the same components are represented by the same reference symbols. In the accompanying drawings:

FIG. 10 shows a robot-based material box detection method provided in an embodiment of the present disclosure.

DETAILED DESCRIPTION

A further detailed description of the present disclosure is given below in conjunction with the accompanying drawings and embodiments. It can be understood that the specific embodiments described here are only intended to explain the present disclosure rather than limit it. Furthermore, it should be noted that for the convenience of description, the accompanying drawings only show some parts related to the present disclosure rather than the entire structure.

Before the exemplary embodiments are discussed in more detail, it should be mentioned that some exemplary embodiments are described as processes or methods depicted as flowcharts. Although the flowcharts describe various operations (or steps) as sequential processes, many of them can be implemented in parallel, concurrently, or simultaneously. In addition, the order of the operations may be rearranged. When the operations are completed, the processes may be terminated, but there may also be additional steps not included in the accompanying drawings. The processes may correspond to methods, functions, procedures, subroutines, subprograms, and the like.

The robot and the robot-based material box detection method provided in the embodiments of the present disclosure will be elaborated in detail below through various embodiments and optional solutions thereof.

Figure 1:
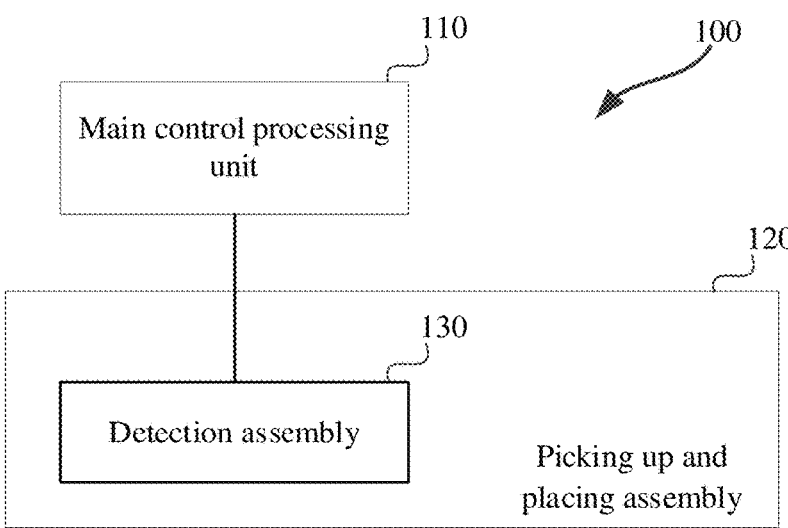
FIG. 1 is a structural block diagram of a robot provided in an embodiment of the present disclosure.

FIG. 1 is a structural block diagram of a robot provided in an embodiment of the present disclosure. This embodiment of the present disclosure is applicable to real-time detection of a material box storage state in a storage position to be detected by the robot. As shown in FIG. 1, the robot 100 in this embodiment of the present application may include: a main control processing unit 110, a picking up and placing assembly 120, and a detection assembly 130 arranged on the picking up and placing assembly 120, where the detection assembly 130 is configured to align with a storage position to be detected along a detection direction to collect data and send the same to the main control processing unit 110; and the main control processing unit 110 is configured to determine a material box storage state in the storage position to be detected based on the data collection result, so as to control the picking up and placing assembly 120 to pick up and place the material box.

Figure 2:
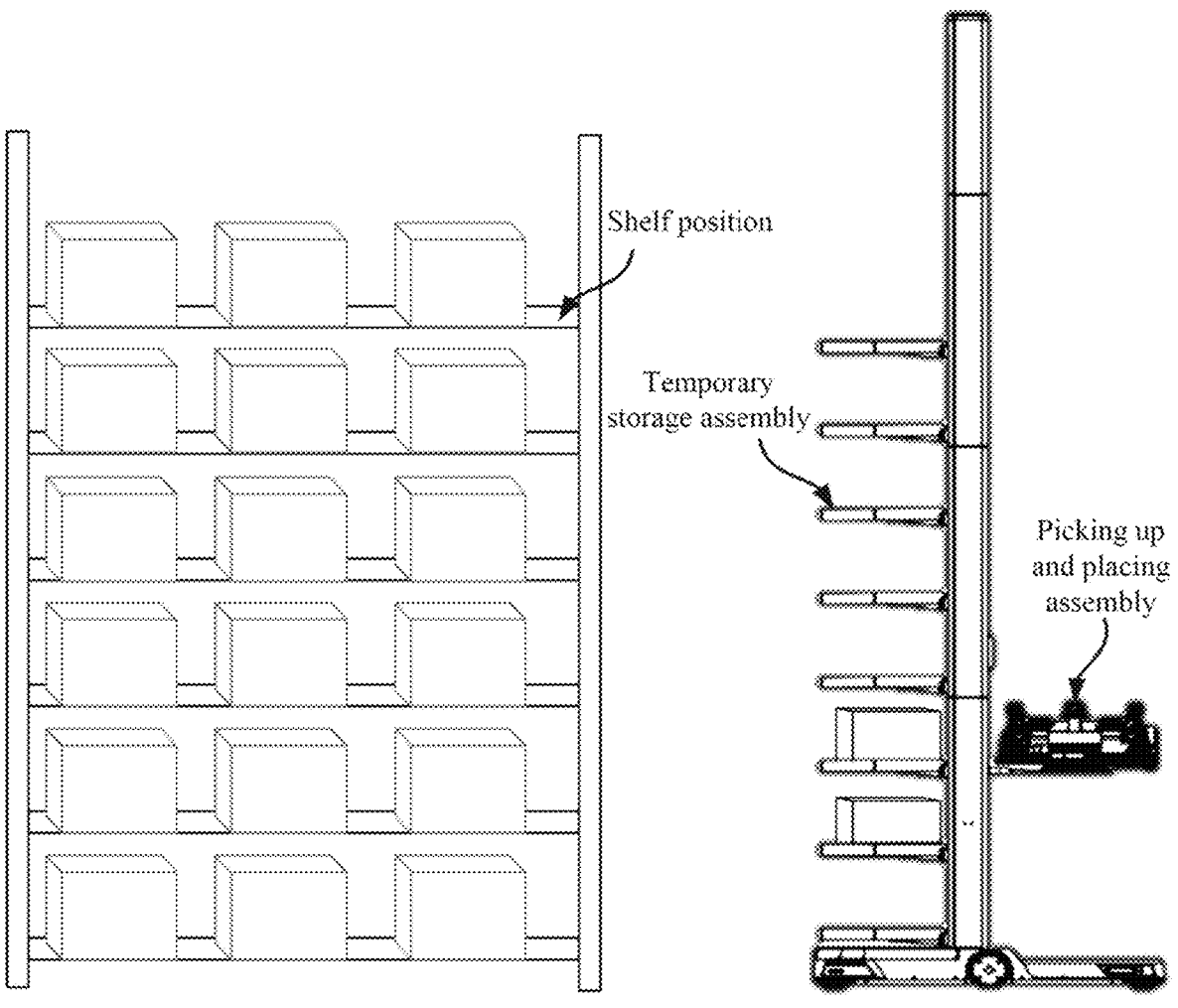
FIG. 2 is a schematic diagram of a robot, provided in an embodiment of the present disclosure, performing material box detection.

Referring to FIG. 2, in the business scenario of a robot picking up and returning a material box, it is sometimes necessary to obtain the material box storage states on temporary storage assemblies of the robot. For example, when the machine task is interrupted and restored, it is necessary to inform a requirements management system (RMS) or an upper service system of the number and positions of material boxes that the robot has picked up on the temporary storage assemblies. Or, sometimes the RMS also needs to reobtain the material box storage states on specific shelf positions for better scheduling the robot to perform the task of picking up and returning boxes. At this point, the storage positions to be detected may be set as the temporary storage assemblies arranged on a body of the robot and the target shelf positions in a warehousing area, so as to detect the storage conditions of the material boxes on the temporary storage assemblies and the shelf positions. The temporary storage assemblies may be temporary storage pallets used for temporary storage of material boxes taken out of or stored in the shelf positions.

Figures 3, 4:
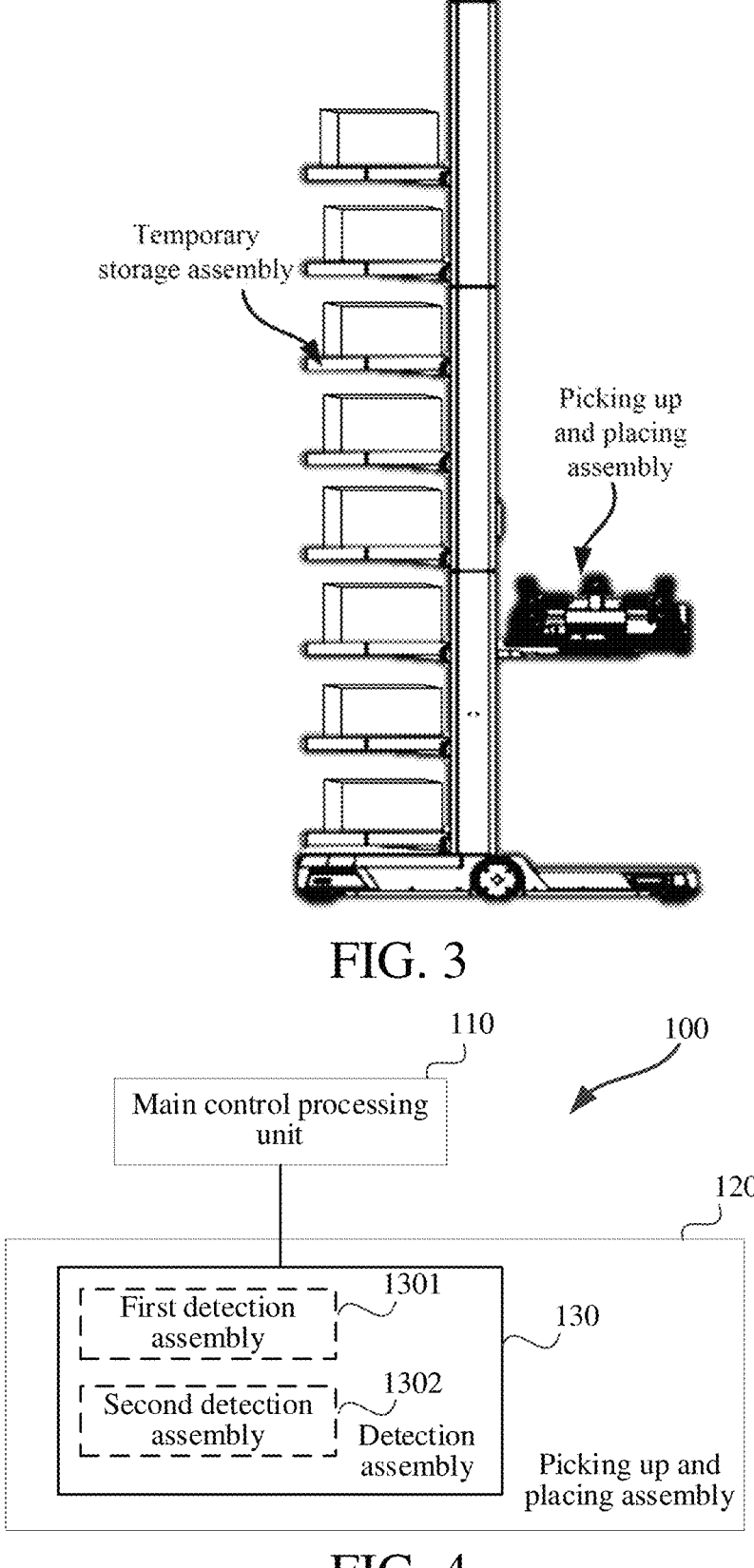
FIG. 3 is a schematic diagram of another robot, provided in an embodiment of the present disclosure, performing material box detection.
FIG. 4 is a structural block diagram of another robot provided in an embodiment of the present disclosure.

Referring to FIG. 3, in the business scenario of a robot picking up and returning a material box, for the robot itself, sometimes before picking up and returning the material box, it is necessary to confirm whether there is a material box on the picking up and placing assembly arranged on a body of the robot, and determine whether there are other material boxes or obstacles occupying the target position, in order to avoid obstruction or collision when the robot picks up and returns the material box, and avoid losses to the robot and other items. At this point, the storage position to be detected may be set as the picking up and placing assembly arranged on a body of the robot, so as to detect the storage condition of the material box on the picking up and placing assembly. The picking up and placing assembly may be configured to take out the material box from the storage position or place the material box in the storage position.

Referring to FIGS. 1 and 2, a detection assembly 130 is installed on the picking up and placing assembly 120 of the robot. When the robot needs to detect the storage condition of a material box in the storage position to be detected, the detection assembly 130 installed on the picking up and placing assembly 120 can align with the storage position to be detected along the detection direction to collect data and send the data collection result to the main control processing unit 110. Further, the main control processing unit 110 determines whether a material box is placed in the storage position to be detected based on a data collection result, so that the robot controls the picking up and placing assembly to pick up and place the material box.

By adopting the solution of the robot provided in this embodiment of the present disclosure, in the scenario of normal picking up and returning operations of the robot or human interference with the material box, the position state of the material box can be obtained through real-time detection performed by the detection assembly on the robot, thereby avoiding abnormal picking up and returning operations of the robot. Also, when the scheduling system cannot accurately record the position and the material box storage state and cannot schedule the robot to perform the task of picking up and returning the box, the storage condition of the material box can be reported to the scheduling system in time, thereby improving the efficiency and reliability of the system.

In an alternative solution of the embodiments of the present disclosure, various alternative solutions in one or more of the aforementioned embodiments may be combined. Referring to FIG. 4, in the robot 100 of the embodiments of the present application, the detection assembly 130 may include a first detection assembly 1301, and the storage positions to be detected are the temporary storage assemblies arranged on a body of the robot and the target shelf positions in the warehousing area, where the main control processing unit 110 is configured to control the picking up and placing assembly 120 to perform movement adjustment, to drive adjustment of the first detection assembly 1301 such that the detection direction of the first detection assembly is aligned with the storage position to be detected.

The first detection assembly 1301 is configured to align with the storage position to be detected along the detection direction to collect data after the detection direction of the first detection assembly 1301 is adjusted.

Referring to FIGS. 2 and 4, the first detection assembly 1301 is arranged on the picking up and placing assembly 120. The picking up and placing assembly 120 is independent of the temporary storage assemblies on the robot and the target shelf positions in the warehousing area, and thus a position of the first detection assembly 1301 is possibly not adjacent to the temporary storage assemblies and the target shelf positions. The main control processing unit 110 controls the picking up and placing assembly 120 to perform movement adjustment, synchronously driving the first detection assembly 1301 to adjust its movement, so that the detection direction of the first detection assembly 1301 can align with the storage position to be detected, that is, with the temporary storage assemblies and the target shelf positions in the warehousing area. Further, the first detection assembly 1301, after the detection direction is adjusted by movement, may align with the storage position to be detected along the detection direction to collect data.

In some embodiments, referring to FIGS. 2, 3, and 4, in the robot 100 according to the embodiments the present application, a plurality of compartments of different heights are arranged on the robot, and the heights between different compartments may be the same or different. One temporary storage assembly is correspondingly arranged in each compartment, and allows for the storage of one material box. The material box may be a storage container for holding various items.

Figure 5:
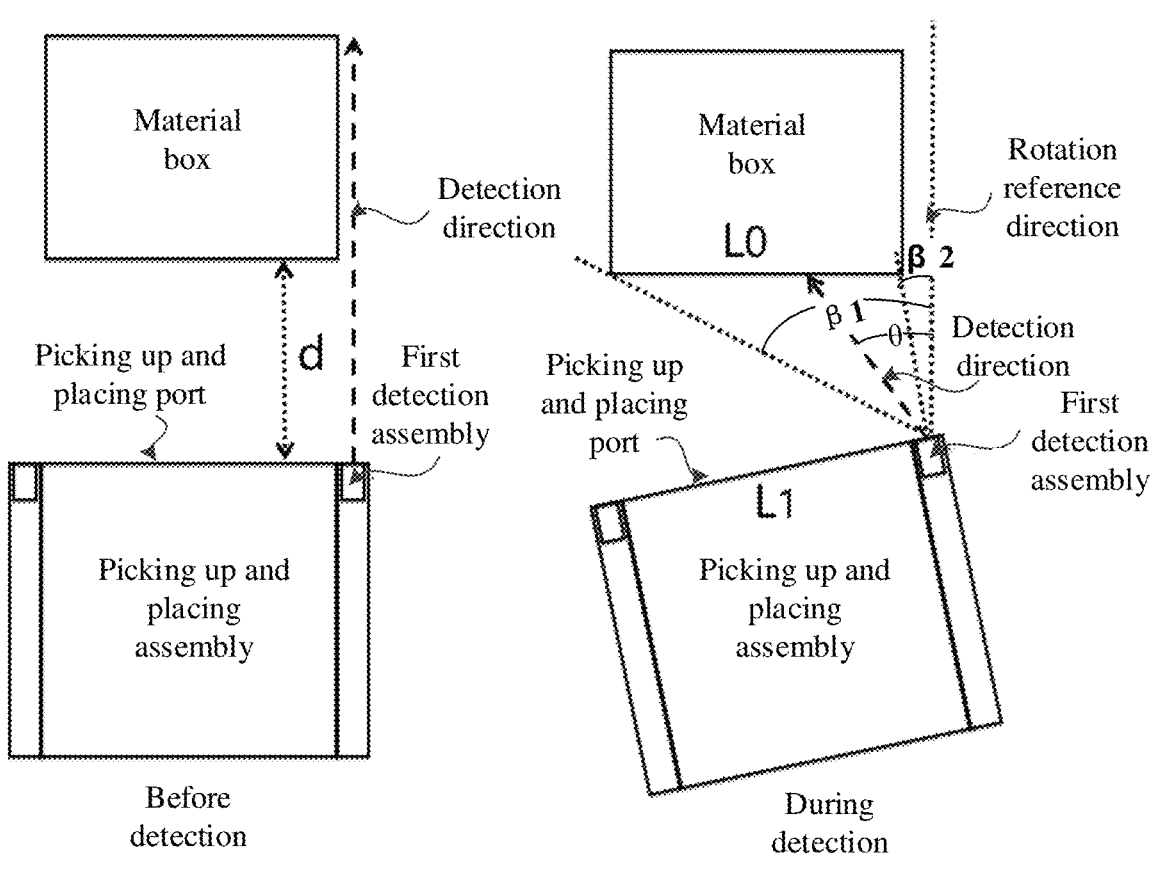
FIG. 5 is a schematic diagram of movement adjustment of a picking up and placing assembly provided in an embodiment of the present disclosure.

In an alternative solution of the embodiments of the present disclosure, various alternative solutions in one or more of the aforementioned embodiments may be combined. Referring to FIGS. 4 and 5, in the robot 100 according to the embodiments of the present disclosure, the detection direction of the first detection assembly 1301 is parallel to the horizontal rotation plane of the picking up and placing assembly 120 on the robot, and the detection direction of the first detection assembly 1301 remains the same as a preset calibration direction on the picking up and placing assembly 120, where the main control processing unit 110 is configured to control the picking up and placing assembly 120 to perform horizontal rotation adjustment and/or height adjustment in a case that the picking up and placing assembly 120 is controlled to move to the opposite side of the storage position to be detected.

Referring to FIGS. 2 and 5, for the temporary storage assemblies arranged on a body of the robot and the target shelf positions in the warehousing area, the spatial positions of the temporary storage assemblies and the target shelf positions are recorded in advance. The main control processing unit 110 may control the picking up and placing assembly 120 of the robot to move to the opposite side of the storage position to be detected based on the position information of the storage position to be detected carried by a received detection instruction. By adjusting the position of the picking up and placing assembly, the picking up and placing assembly 120 is directly adjacent to the storage position to be detected in special position, so that the picking up and placing assembly 120 is flush with or slightly higher than the storage position to be detected.

Referring to FIG. 5, considering the picking up and placing direction of the picking up and placing assembly on the robot, the flatness of an operating area where a body of the robot is, and error that may occur during the movement adjustment process of the picking up and placing assembly, possibly, the detection direction and/or height of the first detection assembly 1301 installed on the picking up and placing assembly 120 may be not appropriate, causing that the detection direction of the first detection assembly 1301 cannot orient towards the inner side of the storage position to be detected. For example, the detection direction of the first detection assembly 1301 faces below or outside the storage position to be detected, resulting in no data collection from the storage position to be detected. To this end, in a case that the picking up and placing assembly moves to the opposite side of the storage position to be detected, by controlling horizontal rotation adjustment of the picking up and placing assembly 120, the detection direction of the first detection assembly 1301 is synchronously driven to horizontally rotate; and, by controlling height adjustment of the picking up and placing assembly 120, the detection direction of the first detection assembly 1301 on the picking up and placing assembly 120 is synchronously driven for height adjustment.

In some embodiments, referring to FIGS. 4 and 5, in the robot 100 according to the embodiments of the present disclosure, two extension fork components are installed on both sides of the picking up and placing assembly 120 of the robot 100, respectively. The preset calibration direction may be the extension fork direction of the extension fork component arranged on one side of the picking up and placing assembly 120 of the robot 100. In some embodiments, the picking up and placing assembly of the robot 100 may include a rotating pallet allowing for horizontal rotation and height adjustment.

In an alternative solution of the embodiments of the present disclosure, various alternative solutions in one or more of the aforementioned embodiments may be combined. Referring to FIGS. 4 and 5, in the robot 100 according to the embodiments of the present disclosure, the first detection assembly 1301 is arranged on the extension fork component on one side of the picking up and placing assembly 120, and the width L1 of a picking up and placing port of the picking up and placing assembly 120 is greater than the size L0 of the material box to be picked up and placed in the storage position to be detected, where the main control processing unit 110 is specifically configured to control the picking up and placing assembly 120 to perform at least one horizontal rotation adjustment based on an effective rotation angle of the picking up and placing assembly 120, in order to drive the first detection assembly 1301 to adjust the detection direction on the same plane.

Referring to FIG. 5, in a case that a material box is placed in the storage position to be detected, before the material box is detected, the picking up and placing port of the picking up and placing assembly 120 on the robot is controlled to align with the material box in the storage position to be detected. When the distance between the picking up and placing assembly 120 and the material box in the storage position to be detected is d, a detection beam or sound wave emitted by the first detection assembly 1301 passes through the outer gap of the material box in the storage position to be detected, and cannot detect the material box. Therefore, when the material box is detected, the picking up and placing assembly 120 needs to be rotated for a certain angle θ, until the detection beam or sound wave emitted by the first detection assembly 1301 along the detection direction is irradiated onto the material box.

Referring to FIG. 5, the effective rotation angle includes the minimum rotation angle 32 and the maximum rotation angle 31 of the first detection assembly 1301 relative to the rotation reference direction, which can make the detection direction of the first detection assembly 1301 point to the material box in the storage position to be detected. The rotation reference direction may be the extension fork direction of the extension fork component on the first detection assembly 1301 when a picking up and placing port of the picking up and placing assembly 120 aligns with the storage position to be detected. In some embodiments, the extension fork direction of the extension fork component on the first detection assembly 1301 is parallel to the direction of the picking up and placing port of the picking up and placing assembly 120.

In an alternative solution of the embodiments of the present disclosure, various alternative solutions in one or more of the aforementioned embodiments may be combined. Referring to FIG. 5, in the robot 100 according to the embodiments of the present disclosure, the minimum rotation angle and the maximum rotation angle involved in the effective rotation angle are determined based on, when the first detection assembly 1301 aligns with a storage position to be detected along a detection direction, the vertical distance from the first detection assembly 1301 to the edge line of the storage position to be detected and the size of a material box to be placed in the storage position to be detected or the size of the storage position to be detected.

Referring to FIG. 5, in a case that the material box storage state in the storage position to be detected is detected, the detection direction of the first detection assembly 1301 on the picking up and placing assembly 120 may be adjusted. It is not difficult to see that when the detection directions of the first detection assembly 1301 respectively face the left and right outer sides of the material box, the detection beam or sound wave emitted by the first detection assembly 1301 along the detection direction is irradiated onto the material box. Otherwise, it is likely that the detection beam or sound wave passes through the outer gap of the material box in the storage position to be detected and cannot detect the material box. Therefore, when the detection directions face the left and right outer sides of the material box, the corresponding angles are the minimum rotation angle and the maximum rotation angle respectively.

Referring to FIG. 5, in a case that the picking up and placing assembly moves to the opposite side of the storage position to be detected, and the detection beam or sound wave emitted by the first detection assembly coincides with the outer edge line of the material box, the minimum effective rotation angle of the picking up and placing assembly 120 is zero. When the picking up and placing assembly 120 rotates to the minimum rotation angle and the maximum rotation angle, the rotation angle range of the picking up and placing assembly 120 is $[0, \arctan(L0/d)]$, and the measurable distance range obtained by the detection beam or sound wave emitted by the first detection assembly 1301 along the detection direction is $[d, (d2+L02)^{1/2}]$. When the material box is detected, the picking up and placing assembly may be controlled to rotate to make the detection direction of the first detection assembly 1301 to rotate to a certain angle in a range of $[0, \arctan(L0/d)]$, and the measured distance L of the first detection assembly 130 at this time can be detected. If the measured distance L is in the range of $[d, (d2+L02)^{1/2}]$, it indicates that there is a material box in the storage position to be detected, otherwise, there is no material box.

In some embodiments, referring to FIG. 5, in the robot 100 according to the embodiments of the present disclosure, the minimum rotation angle and the maximum rotation angle relative to the rotation reference direction involved in the effective rotation angle are in the angle range inferred in a case that a material box is assumed to be on the opposite side. However, in the actual scenario of the embodiments of the present disclosure, it is to be detected that whether there is a material box in the storage position to be detected. Therefore, it can be seen that the picking up and placing assembly cannot be controlled to align with the material box, but only to move to the opposite side of the storage position to be detected. Once the material box and the picking up and placing assembly are not aligned (the material box has a certain slope in the storage position to be detected), some angles in the effective angle range inferred above cannot allow the detection beam or sound wave emitted by the first detection assembly along the detection direction to be irradiated onto the material box in the storage position to be detected, and multiple adjustments are required. Therefore, when the horizontal rotation adjustment of the picking up and placing assembly is controlled based on the effective rotation angle thereof, the angles in the middle range may be selected from the effective rotation angle range to control the picking up and placing assembly to perform horizontal rotation adjustment. Because regardless of the placement angle of the material box in the storage position to be detected, the rotation angles in the middle range of the effective angle range usually can ensure that the detection beam or sound wave emitted by the first detection assembly along the detection direction can be irradiated onto the material box at once, thereby avoiding multiple horizontal rotations of the picking up and placing assembly.

Figure 6:
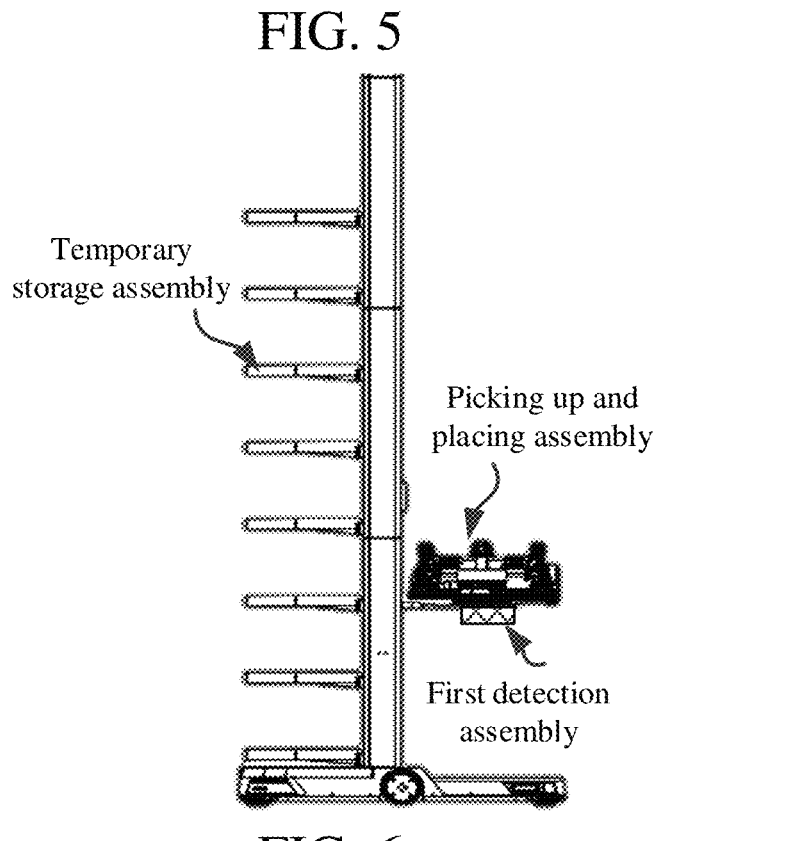
FIG. 6 is an installation diagram of a detection assembly provided in an embodiment of the present disclosure.

In another alternative solution of the embodiments of the present disclosure, various alternative solutions in one or more of the aforementioned embodiments may be combined. Referring to FIGS. 4, 5, and 6, in the robot 100 according to the embodiments of the present disclosure, the first detection assembly 1301 is arranged at the bottom of the picking up and placing assembly 120, where the main control processing unit 110 is specifically configured to control the picking up and placing assembly 120 to perform height adjustment, so that the bottom of the picking up and placing assembly 120 is higher than the storage position to be detected and the height difference is less than a preset threshold, and, control the picking up and placing assembly 120 to rotate horizontally, so as to drive the first detection assembly 1301 to align with the storage position to be detected along the detection direction.

Referring to FIG. 6, in a case that the picking up and placing assembly 120 is controlled to move to the opposite side of the storage position to be detected, as the first detection assembly 1301 is arranged at the bottom of the picking up and placing assembly 120, as long as the height of the first detection assembly is appropriate, the detection beam or sound wave emitted by the first detection assembly along the detection direction can be irradiated onto the material box in the storage position to be detected at once. In this way, in a case that the first detection assembly 1301 is arranged at the bottom of the picking up and placing assembly 120, the picking up and placing assembly needs to be controlled to be slightly higher than the storage position to be detected, e.g., a temporary storage assembly or a target shelf position, and then the picking up and placing assembly is horizontally rotated to make the first detection assembly align with the material box along the detection direction.

In an alternative solution of the embodiments of the present disclosure, various alternative solutions in one or more of the aforementioned embodiments may be combined. Referring to FIG. 4, in the robot 100 according to the embodiments of the present application, the first detection assembly 1301 may be an image recognition type sensor or a ranging sensor, and the data collection result is a ranging information or image information obtained at a front of a detection field when the first detection assembly 1301 aligns with the storage position to be detected.

In some embodiments, the ranging sensor includes, but is not limited to, an infrared diffuse reflection sensor, a visible light sensor, a laser sensor, an ultrasonic sensor, and the like. The ranging sensor calculates the distance to an obstacle in front by emitting a beam or sound wave to the front of a detection field and calculating the round-trip time.

In some embodiments, the image recognition type sensor includes, but is not limited to, a camera, a depth camera, and the like. The image recognition sensor collects image information in the front field of view of detection, and then detects the presence of a material box and/or obstacle in front through machine vision recognition.

After the detection direction is adjusted and the first detection assembly 1301 aligns with the storage position to be detected along the detection direction to collect data, the main control processing unit 110 may determine whether there is a material box on the storage position to be detected based on the ranging information or image information obtained at the front of the detection field by the first detection assembly 1301. For example, when the angle of the picking up and placing assembly is adjusted to make the detection beam or sound wave emitted by the first detection assembly along the detection direction be irradiated to a storage position to be detected at once to detect the presence of a material box, the ranging information or obstacle information recognized by an image obtained by the first detection assembly along the detection direction is read, and based on the ranging information or obstacle information recognized by the image, whether the measured distance is within a preset distance range or whether there is an obstacle is determined to further determine whether there is a material box blocking in the storage position to be detected. Further, the information on the presence of the material box is recorded and reported to a server, and the angle of the picking up and placing assembly is controlled to restore an initial angle (if the extension fork component where the first detection assembly is affects lifting, the initial angle of the picking up and placing assembly may be not restored). The picking up and placing assembly is controlled to move to an opposite side of the next storage position to be detected to detect the next material box.

In an alternative solution of the embodiments of the present disclosure, various alternative solutions in one or more of the aforementioned embodiments may be combined. Referring to FIG. 4, in the robot 100 according to the embodiments of the present application, the detection assembly 130 may include a second detection assembly 1302, the storage position to be detected includes the picking up and placing assembly arranged on a body of the robot, and the second detection assembly 1302 aligns with the inside of the picking up and placing assembly along a detection direction. In this way, when a material box enters the picking up and placing assembly for placement, the material box approaches the second detection assembly 1302 arranged on the picking up and placing assembly 120, and blocks a detection beam or sound wave emitted by the second detection assembly 1302 along the detection direction at the front of a detection field of the second detection assembly 1302.

Figure 7:
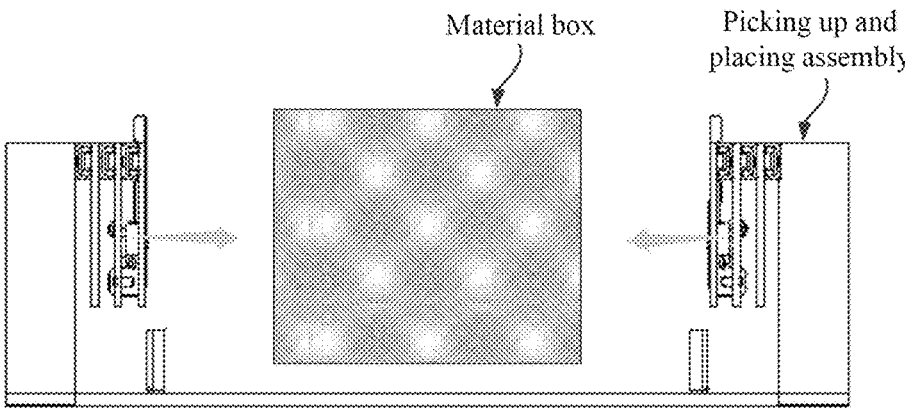
FIG. 7 is a front view of a detection assembly provided in an embodiment of the present disclosure.
Figure 8:
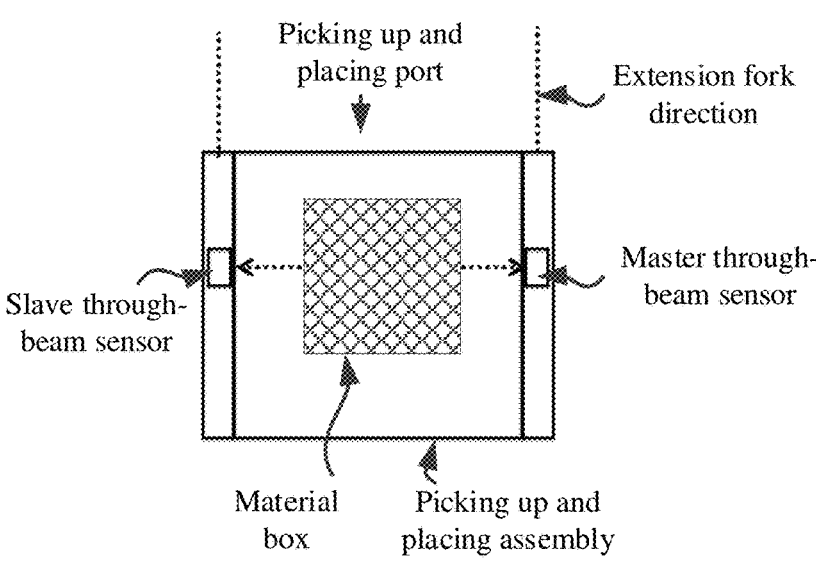
FIG. 8 is a top view of a detection assembly provided in an embodiment of the present disclosure.

In some embodiments, referring to FIGS. 7 and 8, the second detection assembly 1302 may include master-slave through-beam sensors respectively arranged at two inner sides of the picking up and placing assembly 120 to block a through-beam path between the master-slave through-beam sensors when a material box enters the picking up and placing assembly. In some embodiments, the second detection assembly 1302 may include master-slave through-beam sensors respectively arranged on two extension fork components on two sides of the picking up and placing assembly 120, so as to make a material box entering the picking up and placing assembly block a through-beam path between the master-slave through-beam sensors after the extension fork components on the two sides return to the picking up and placing assembly.

Referring to FIGS. 7 and 8, the data collection result obtained by aligning the second detection assembly 1302 with the storage position to be detected along the detection direction may include the conduction state of the through-beam path between the master-slave through-beam sensors when the second detection assembly 1302 aligns with the storage position to be detected. If there is no material box in the storage position to be detected, light emitted by the master through-beam sensor can be not blocked, but received by the slave through-beam sensor, and the light path is conducted. On the contrary, if there is a material box in the storage position to be detected, the material box may block the light emitted by the master through-beam sensor, causing the light path to be blocked, and the light emitted by the master through-beam sensor cannot be received by the slave through-beam sensor.

Figure 9:
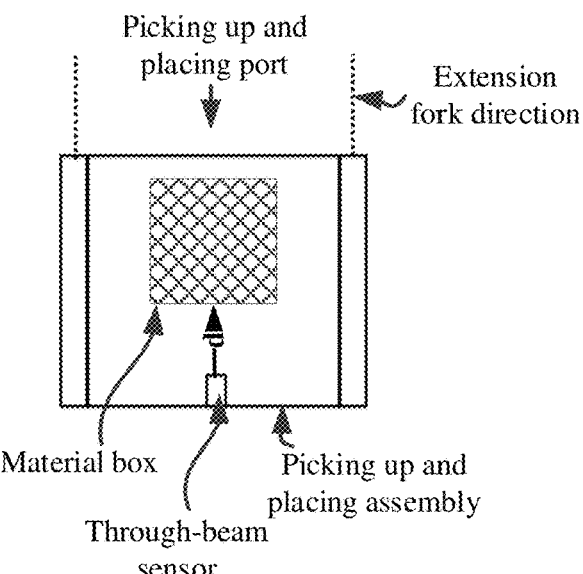
FIG. 9 is a top view of another detection assembly provided in an embodiment of the present disclosure.

In some embodiments, referring to FIGS. 7 and 9, the second detection assembly 1302 may include a single ranging sensor arranged on the inner side of the picking up and placing assembly 120 aligned with the picking up and placing port of the picking up and placing assembly 120, and the detection direction of the single ranging sensor is consistent with the direction of the picking up and placing port of the picking up and placing assembly 120. In some embodiments, the second detection assembly 1302, e.g., the single ranging sensor is installed on the innermost side wall aligned with the picking up and placing port of the picking up and placing assembly 120. The detection direction of the single ranging sensor faces towards the picking up and placing port of the picking up and placing assembly 120, and the detection direction of the single ranging sensor is perpendicular to the inner wall of the picking up and placing assembly 120.

Referring to FIGS. 7 and 9, the data collection result obtained by aligning the second detection assembly 1302 with the storage position to be detected along the detection direction may include ranging information obtained at the front of a detection field when the second detection assembly 1302 aligns with the storage position to be detected. By measuring the distance d of an obstacle in front, if the distance d at the front of a detection field obtained by the second detection assembly 1302 is less than the length of the picking up and placing assembly along the direction of the picking up and placing port, it is considered that there is a material box blocking in a preset distance at the front of the detection field of the detection assembly 1302, indicating the presence of a material box in the storage position to be detected. Otherwise, it is considered that there is no material box blocking in the preset distance at the front of the detection field of the second detection assembly 1302, indicating that there is no material box in the storage position to be detected. In some embodiments, the single ranging sensor may specifically be a single infrared through-beam sensor.

FIG. 10 is a flowchart of a robot-based material box detection method provided in an embodiment of the present disclosure. This embodiment of the present disclosure is applicable to real-time detection of a material box storage state in a storage position to be detected by the robot. As shown in FIG. 10, the robot-based material box detection method in this embodiment of the present application may include the following steps: S1010, aligning a detection assembly arranged on a picking up and placing assembly of a robot with a storage position to be detected along a detection direction to collect data and send the same to a main control processing unit on the robot; and S1020, determining, by the main control processing unit, a material box storage state in the storage position to be detected based on a data collection result, so as to control the picking up and placing assembly to pick up or place a material box.

In some embodiments based on the above embodiments, the aligning a detection assembly arranged on a picking up and placing assembly of a robot with a storage position to be detected along a detection direction to collect data and send the same to a main control processing unit on the robot, includes: controlling the picking up and placing assembly of the robot to perform movement adjustment by the main control processing unit, so as to drive adjustment of a first detection assembly of the detection assembly such that the detection direction of the first detection assembly is aligned with the storage position to be detected, where the storage position to be detected includes a temporary storage assembly arranged on a body of the robot and a target shelf position in a warehousing area; and aligning the first detection assembly with the storage position to be detected along the detection direction to collect data after the detection direction of the first detection assembly is adjusted.

In some embodiments based on the above embodiments, a plurality of compartments of different heights are arranged on the robot, and each compartment is correspondingly provided with one temporary storage assembly.

In some embodiments based on the above embodiments, after the picking up and placing assembly is controlled to perform movement adjustment, the method further includes: controlling the picking up and placing assembly to perform horizontal rotation adjustment and/or height adjustment by the main control processing unit in a case that the picking up and placing assembly is controlled to move to an opposite side of the storage position to be detected, where the detection direction of the first detection assembly is parallel to a horizontal rotation plane of the picking up and placing assembly, and the detection direction of the first detection assembly remains the same as a preset calibration direction on the picking up and placing assembly.

In some embodiments based on the above embodiments, the preset calibration direction includes an extension fork direction of an extension fork component arranged on one side of the picking up and placing assembly.

In some embodiments based on the above embodiments, the picking up and placing assembly includes a rotating pallet allowing for horizontal rotation and height adjustment.

In some embodiments based on the above embodiments, the first detection assembly is arranged on an extension fork component on one side of the picking up and placing assembly; and correspondingly, the controlling the picking up and placing assembly to perform horizontal rotation adjustment includes: controlling the picking up and placing assembly to perform at least one horizontal rotation adjustment based on an effective rotation angle of the picking up and placing assembly by the main control processing unit, in order to drive the first detection assembly to adjust the detection direction on the same plane, where the effective rotation angle includes a minimum rotation angle and a maximum rotation angle of the first detection assembly, relative to a rotation reference direction, which can make the detection direction of the first detection assembly point to a material box in the storage position to be detected; and the rotation reference direction is an extension fork direction of the extension fork component on the first detection assembly when a picking up and placing port of the picking up and placing assembly aligns with the storage position to be detected.

In some embodiments based on the above embodiments, the minimum rotation angle and the maximum rotation angle are determined based on, when the first detection assembly aligns with a storage position to be detected along the detection direction, a vertical distance from the first detection assembly to an edge line of the storage position to be detected and a size of a material box to be placed in the storage position to be detected or a size of the storage position to be detected.

In some embodiments based on the above embodiments, the first detection assembly is arranged at a bottom of the picking up and placing assembly; and correspondingly, the controlling the picking up and placing assembly to perform horizontal rotation adjustment and height adjustment includes: controlling the picking up and placing assembly to perform height adjustment by the main control processing unit, so that the bottom of the picking up and placing assembly is higher than the storage position to be detected and a height difference is less than a preset threshold; and, controlling the picking up and placing assembly to rotate horizontally, so as to drive the first detection assembly to align with the storage position to be detected along the detection direction.

In some embodiments based on the above embodiments, the first detection assembly is an image recognition type sensor or a ranging sensor; and the data collection result is the ranging information or image information obtained at the front of a detection field when the first detection assembly aligns with the storage position to be detected.

In some embodiments based on the above embodiments, the determining a material box storage state in a storage position to be detected based on the data collection result includes: determining whether there is a material box on the storage position to be detected based on the ranging information or image information obtained at the front of a detection field by the first detection assembly.

In some embodiments based on the above embodiments, the detection assembly includes a second detection assembly, a detection direction of the second detection assembly aligns with an inside of the picking up and placing assembly, and the storage position to be detected includes the picking up and placing assembly arranged on a body of the robot.

In some embodiments based on the above embodiments, the second detection assembly includes master-slave through-beam sensors respectively arranged at two inner sides of the picking up and placing assembly to block a through-beam path between the master-slave through-beam sensors when a material box enters the picking up and placing assembly.

In some embodiments based on the above embodiments, the second detection assembly includes master-slave through-beam sensors respectively arranged on two extension fork components on two sides of the picking up and placing assembly.

In some embodiments based on the above embodiments, the data collection result includes a conduction state of the through-beam path between the master-slave through-beam sensors when the second detection assembly aligns with the storage position to be detected.

In some embodiments based on the above embodiments, the second detection assembly includes a single ranging sensor arranged on an inner side of the picking up and placing assembly aligned with a picking up and placing port of the picking up and placing assembly, and the detection direction of the single ranging sensor is consistent with a direction of the picking up and placing port of the picking up and placing assembly.

In some embodiments based on the above embodiments, the data collection result is ranging information obtained by the second detection assembly at the front of a detection field when the second detection assembly aligns with the storage position to be detected.

The robot-based material box detection method provided in the embodiments of the present disclosure may be performed by the robot provided in any embodiment of the present disclosure, and has the corresponding functions and beneficial effects of the robot performing the robot-based material box detection method. The technical details not fully described in the above embodiments may be found in the operation process of the robot provided in any embodiment of the present application.

An embodiment of the present disclosure further provides a computer-readable storage medium on which a computer program is stored, the program, when executed by a processor, implementing the aforementioned robot-based material box detection method.

An embodiment of the present disclosure further provides a computer program product including computer program code, the computer program code, when run on a computer, performing the aforementioned robot-based material box detection method.

An embodiment of the present disclosure further provides a computer program including computer program code, the computer program code, when run on a computer, causing the computer to perform the aforementioned robot-based material box detection method.

In the description of this specification, the reference terms "one embodiment", "some embodiments", "examples", "specific examples", "some examples", or the like refer to that the specific features, structures, materials, or characteristics described in conjunction with the embodiments or examples are included in at least one embodiment or example of the present disclosure. In this specification, the schematic expressions of the above terms do not necessarily refer to the same embodiments or examples. Moreover, the specific features, structures, materials, or characteristics described may be combined in an appropriate manner in any one or more embodiments or examples.

It should be noted that the above are only preferred embodiments and technical principles used in the present disclosure. Those skilled in the art may understand that the present disclosure is not limited to the specific embodiments described here, and various obvious changes, adjustments, and substitutions can be made by those skilled in the art without departing from the scope of protection of the present disclosure. Therefore, although the present disclosure has been explained in detail through the above embodiments, the present disclosure is not limited to the above embodiments. Without departing from the concept of the present disclosure, many other equivalent embodiments may be included, and the scope of the present disclosure is defined by the scope of the attached claims.

What is claimed is:

1. A robot, comprising a main control processing unit, a picking up and placing assembly, and a detection assembly arranged on the picking up and placing assembly, wherein the detection assembly is configured to align with a storage position to be detected along a detection direction to collect data and send a data collection result to the main control processing unit; and the main control processing unit is configured to determine a material box storage state in the storage position to be detected based on the data collection result, wherein the picking up and placing assembly comprises a picking up and placing port and an extension fork component on a side of the picking up and placing assembly;

wherein the detection assembly comprises a first detection assembly, the first detection assembly beinq a ranging sensor arranged on the extension fork component of the picking up and placing assembly, with detection direction of the ranging sensor beinq consistent with an extension direction of the extension fork component;

wherein the main control processing unit is configured to control the picking up and placing assembly to be moved into alignment with the storage position to be detected, and to control the picking up and placing assembly to perform at least one horizontal rotation and adjustment based on an effective rotation angle of the picking up and placing assembly, to drive the first detection assembly to adjust its detection direction so as to align with the storage position to be detected, wherein the effective rotation angle is a rotation angle of the detection assembly, relative to a rotation reference direction, that can make the detection direction of the detection assembly point to a material box in the storage position to be detected, and comprises a minimum rotation angle and a maximum rotation angle, wherein the rotation reference direction is an extension fork direction of the extension fork component, on which the first detection assembly is located, when the picking up and placing port of the picking up and placing assembly aligns with the storage position to be detected;

wherein when the detection direction faces one outer side of the material box, the corresponding angle is the minimum rotation angle, and when the detection direction faces the other outer side of the material box, the corresponding angle is the maximum rotation angle; and the main control processing unit is further configured to determine, during rotation of the detection assembly between the minimum rotation angle and the maximum rotation angle, that there is a material box in the storage position to be detected if a distance measured by the detection assembly is in a preset distance range, wherein the preset distance range is set to be a distance range measured by the first detection component as the picking up and placing assembly rotates from the minimum rotation angle to the maximum rotation angle when a material box is present in the storage position to be detected.

2. The robot according to claim 1, wherein the minimum rotation angle and the maximum rotation angle are determined based on, when the first detection assembly aligns with a storage position to be detected along the detection direction, (1) a vertical distance from the first detection assembly to an edge line of the storage position to be detected and (2) a size of a material box to be placed in the storage position to be detected or a size of the storage position to be detected.

3. The robot according to claim 1, wherein an angle range of the effective rotation angle is $[0, \arctan(L_0/d)]$, and the preset distance range is $[d, (d^2+L_0^2)^{1/2}]$, wherein, $L_0$ is a size of a material box to be placed in the storage position to be detected, and d refers to a vertical distance from the first detection assembly to an edge line of the storage position to be detected.

4. The robot according to claim 1, wherein the main control processing unit is configured to control the picking up and placing assembly to perform horizontal rotation adjustment and/or height adjustment based on the effective rotation angle of the first detection assembly, in a case that the picking up and placing assembly is moved to align with the storage position to be detected, such that the detection direction of the first detection assembly aligns with the storage position to be detected.

5. The root according to claim 1, wherein the detection assembly comprises the first detection assembly arranged at a bottom of the picking up and placing assembly; and the main control processing unit is configured to control the picking up and placing assembly to perform height adjustment, such that the bottom of the picking up and placing assembly is higher than the storage position to be detected and a height difference therebetween is less than a preset threshold; and control the picking up and placing assembly to rotate horizontally, so as to drive the first detection assembly to rotate such that the detection direction of the first detection assembly is aligned with the storage position to be detected.

6. The root according to claim 1, wherein the detection assembly comprises the first detection assembly, and the storage position to be detected comprises a temporary storage assembly arranged on a body of the robot and a target shelf position in a warehousing area;

the main control processing unit is configured to control the picking up and placing assembly to perform movement adjustment such that the detection direction of the first detection assembly is aligned with the storage position to be detected; and the first detection assembly is configured to, after being aligned with the storage position to be detected along the detection direction, collect data and send a data collection result to the main control processing unit.

7. The robot according to claim 6, wherein a plurality of compartments of different heights are arranged on the robot, and each compartment is correspondingly provided with one temporary storage assembly.

8. The robot according to claim 1, wherein the detection assembly further comprises a second detection assembly, a detection direction of the second detection assembly aligns with an inside of the picking up and placing assembly, and the storage position to be detected comprises the picking up and placing assembly arranged on a body of the robot.

9. The robot according to claim 8, wherein the second detection assembly comprises master-slave through-beam sensors respectively arranged at two inner sides of the picking up and placing assembly so as to block a through-beam path between the master-slave through-beam sensors when a material box enters the picking up and placing assembly.

10. The robot according to claim 9, wherein the data collection result comprises a conduction state of the through-beam path between the master-slave through-beam sensors when the second detection assembly aligns with the storage position to be detected.

11. The robot according to claim 8, wherein the second detection assembly comprises master-slave through-beam sensors respectively arranged on two extension fork components on two sides of the picking up and placing assembly.

12. The robot according to claim 8, wherein the second detection assembly comprises a single ranging sensor arranged on an inner side of the picking up and placing assembly aligned with the picking up and placing port of the picking up and placing assembly, and the detection direction of the single ranging sensor is consistent with a direction of the picking up and placing port of the picking up and placing assembly.

13. The robot according to claim 12, wherein the data collection result is a distance information obtained by the second detection assembly when the second detection assembly aligns with the storage position to be detected.

14. A robot-based material box detection method, comprising the following steps:

aligning a detection assembly arranged on a picking up and placing assembly of a robot with a storage position to be detected along a detection direction to collect data and send a data collection result to a main control processing unit on the robot; and determining, by the main control processing unit, a material box storage state in the storage position to be detected based on the data collection result, wherein the aligning of the detection assembly arranged on the picking up and placing assembly of the robot with the storage position to be detected along the detection direction to collect data comprises:

controlling, by the main control processing unit, the picking up and placing assembly to control the picking up and placing assembly to be moved into alignment with the storage position to be detected, and to perform at least one horizontal rotation and adjustment based on an effective rotation angle of the picking up and placing assembly, to drive the first detection assembly to adjust its detection direction so as to align with the storage position to be detected and to collect data; wherein the effective rotation angle is a rotation angle of the first detection assembly, relative to a rotation reference direction, that can make the detection direction of the detection assembly point to a material box in the storage position to be detected, and comprises a minimum rotation angle and a maximum rotation angle; and the determining, by the main control processing unit, the material box storage state in the storage position to be detected based on the data collection result comprises: determining, during rotation of the detection assembly between the minimum rotation angle and the maximum rotation angle, that there is a material box in the storage position to be detected if a distance measured by the first detection assembly is in a preset distance range, wherein the picking up and placing assembly comprises a picking up and placing port and an extension fork component on a side of the picking up and placing assembly, wherein the detection assembly comprises a first detection assembly, the first detection assembly being a ranging sensor arranged on the extension fork component of the picking up and placing assembly, with detection direction of the ranging sensor beinq consistent with an extension direction of the extension fork component, wherein the rotation reference direction is an extension fork direction of the extension fork component, on which the first detection assembly is located, when the picking up and placing port of the picking up and placing assembly aligns with the storage position to be detected, wherein when the detection direction faces one outer side of the material box, the corresponding angle is the minimum rotation angle, and when the detection direction faces the other outer side of the material box, the corresponding angle is the maximum rotation angle;

wherein the preset distance range is set to be a distance range measured by the first detection component as the picking up and placing assembly rotates from the minimum B rotation angle to the maximum rotation angle when a material box is present in the storage position to be detected.

15. The detection method according to claim 14, wherein the minimum rotation angle and the maximum rotation angle are determined based on, when the first detection assembly aligns with a storage position to be detected along the detection direction, (1) a vertical distance from the first detection assembly to an edge line of the storage position to be detected and (2) a size of a material box to be placed in the storage position to be detected or a size of the storage position to be detected.

16. The detection method according to claim 14, wherein an angle range of the effective rotation angle is [0, arctan $(L_0/d)$], and the preset distance range is [d, $(d^2+L_0^2)^{1/2}$], wherein, $L_0$ is a size of a material box to be placed in the storage position to be detected, and d refers to a vertical distance from the first detection assembly to an edge line of the storage position to be detected.

17. A non-transitory computer-readable storage medium on which a computer program is stored, wherein the computer program, when executed by processor, implements the robot-based material box detection method according to claim 14.

\* \* \* \* \*